Oct. 9, 1928.
G. S. BLAKESLEE
1,686,511
DISHWASHING MACHINE
Filed July 19, 1920    2 Sheets-Sheet 1
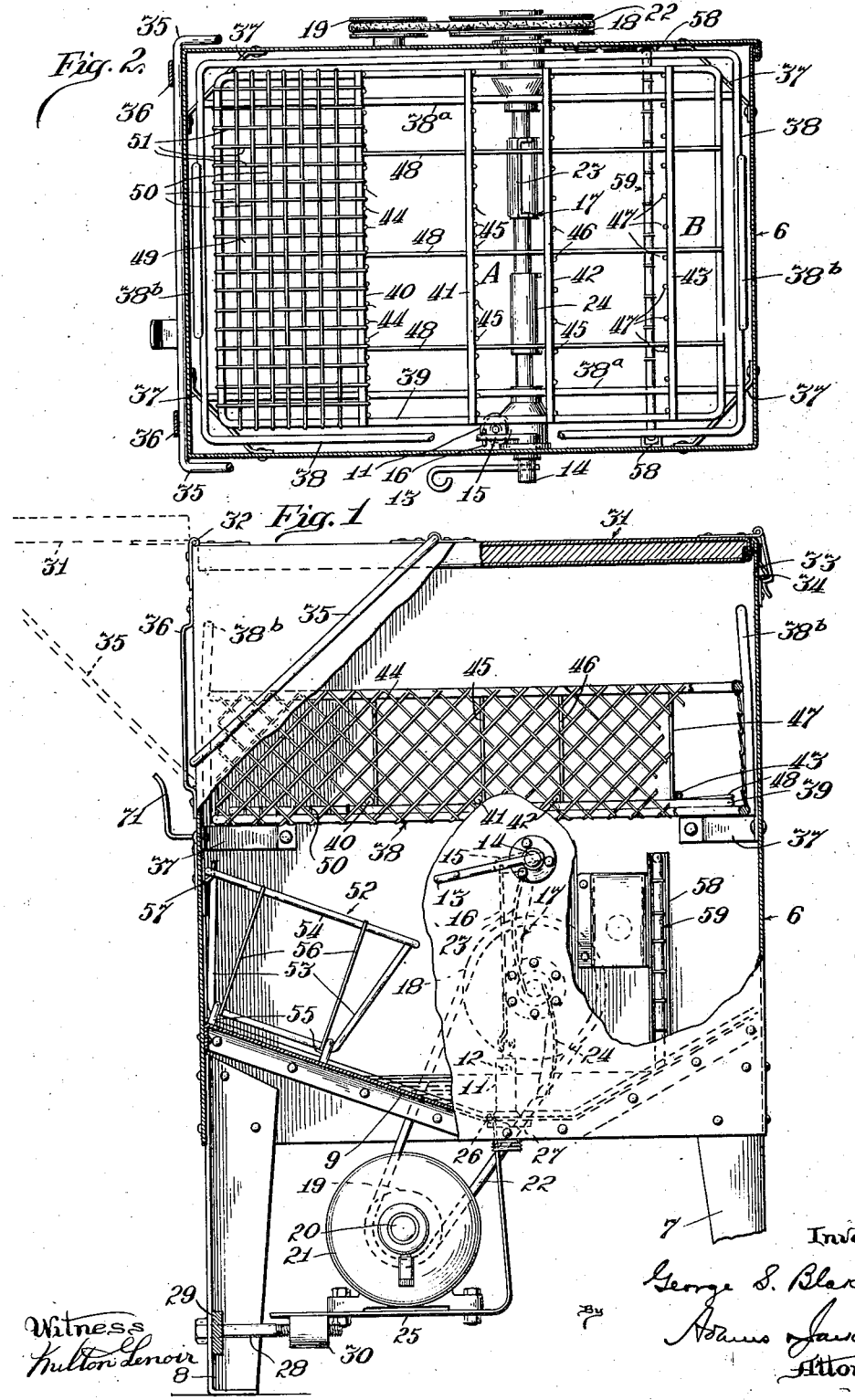

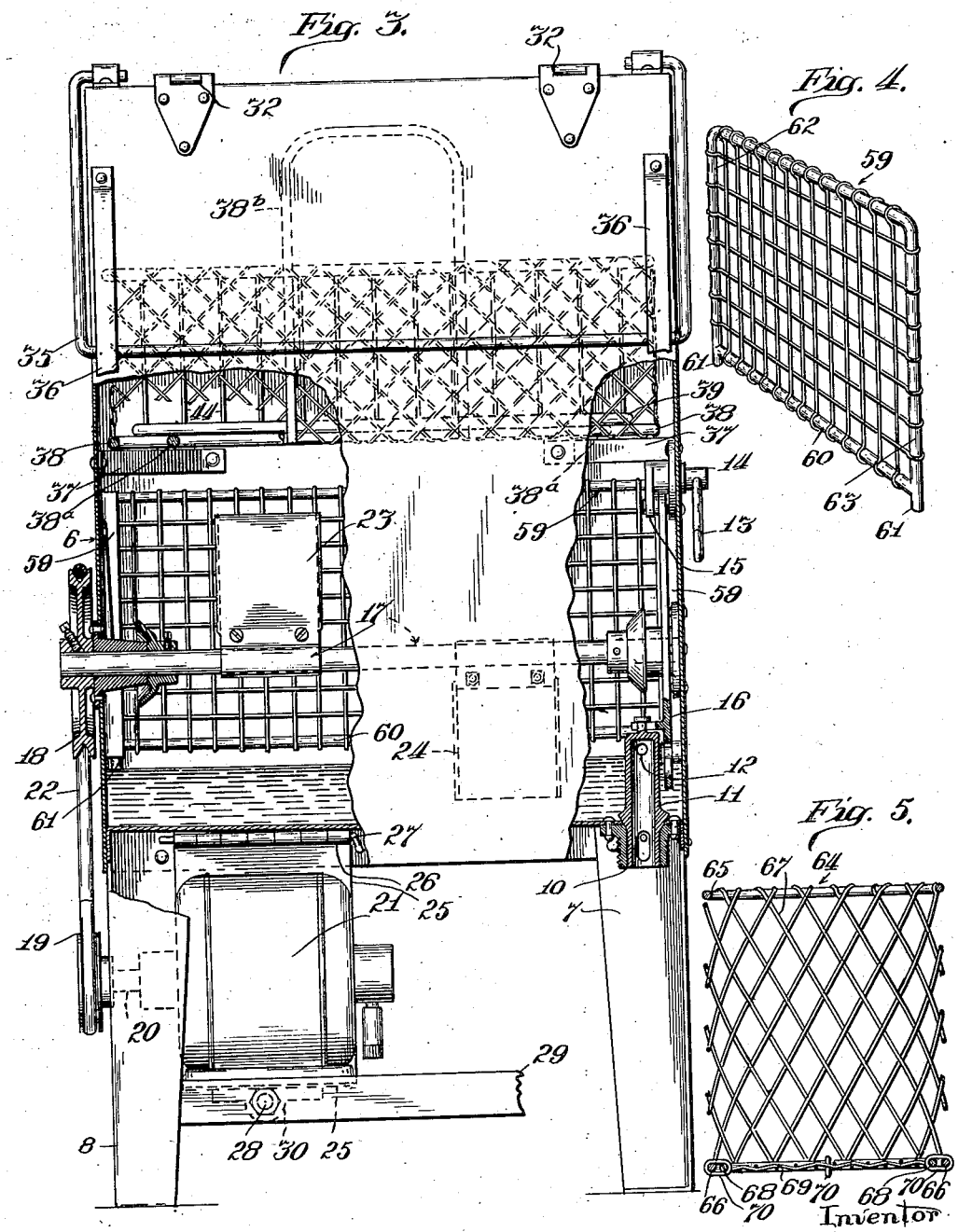

Patented Oct. 9, 1928.

1,686,511

UNITED STATES PATENT OFFICE.

GEORGE S. BLAKESLEE, OF OAK PARK, ILLINOIS; GEORGE R. BLAKESLEE EXECUTOR OF THE SAID GEORGE S. BLAKESLEE, DECEASED.

DISHWASHING MACHINE.

Application filed July 19, 1920. Serial No. 397,234.

My invention relates to dish washing machines and has for its object to provide a compact and easily operated machine which will be peculiarly suitable for household use. To this end it consists in the novel features illustrated in the drawings and hereinafter described. What I regard as new is set forth in the claims.

In the accompanying drawings,—

Fig. 1 is a side elevation, partly in section, illustrating my improved machine;

Fig. 2 is a plan view, partly in section, the tank cover being omitted;

Fig. 3 is an end elevation partly in section;

Fig. 4 is a perspective view illustrating a screen which forms the inside wall of a dish holding compartment; and Fig. 5 is a sectional view of the basket used for silverware.

My improved machine comprises a sheet metal tank 6, rectangular in horizontal section, and supported on legs 7, 8. Said tank is provided with a V-shaped bottom 9, at one end of the valley of which is an outlet opening 10 through which the water in the tank may be drawn off when desired. Said outlet is normally closed by a cylindrical plug 11 having near its upper end an overflow opening 12 which limits the depth of the water in the tank. The lower end of this plug telescopes into the opening 10, as shown in Fig. 3, so that the outlet 10 guides the plug when it is moved vertically toward or from its seat. The plug 11 is operated by a lever 13 connected with a shaft 14 having a crank 15 which is connected by a rod 16 to the upper end of the plug, as shown in Figs. 1 and 3.

17 indicates a paddle wheel shaft which extends transversely of the tank a short distance above the normal water level. One end of said shaft extends out through the tank wall, as shown at the left in Fig. 3, and carries a pulley 18 adapted to be connected with a pulley 19 on the armature shaft 20 of a motor 21 by a belt 22. 23, 24 indicate paddles carried by the shaft 17 and extending in opposite directions therefrom, said paddles being spaced a distance apart from each other, as shown in Fig. 3. These paddles are preferably curved slightly and disposed tangentially to the shaft, as shown in Fig. 1. They are arranged to dip into the water in the tank and operate to throw the water throughout the tank in the usual way, thereby thoroughly distributing it throughout all parts of the tank and scouring the dishes therein contained.

The motor 21 is mounted below the bottom 9 at one side of the tank upon a swinging bracket 25, which, as shown in Figure 1, is L-shaped and is pivotally connected with the tank by means of a hinge 26 and pintle 27, as best shown in Fig. 3. The lower or horizontal arm of the bracket 25 is firmly secured by means of a bolt 28 mounted in a cross-bar 29 secured to the legs 8, as shown in Fig. 1, and working in a threaded boss 30 secured to the under side of the bracket 25. By this construction by adjusting the bolt 28 the bracket 25 may be moved laterally to a sufficient extent to secure any desirable adjustment of the tension of the belt 22, the flexibility of the vertical arm of said bracket, which is preferably made of sheet metal, contributing to this end.

31 indicates the cover of the tank, which, as best shown in Fig. 1, is arranged to fit closely into the upper end of the tank and is connected therewith at one end by hinges 32. At its opposite end it is provided with a latch 33 adapted to engage a keeper 34 secured to the tank to hold the cover in its closed position. The cover is adapted to be swung through an arc of 180° so as to occupy a horizontal position at one side of the tank, and thereby serve as a tray or table to support articles before they are placed in the machine or after they are removed therefrom, and in order to support the cover when it is in its opened position, as well as to guide it while being moved from one position to another, a bail 35 is provided, the ends of which are connected with the opposite sides of the cover 31 between its ends, while the intermediate or looped portion of the bail extends across one end of the tank outside thereof between guides or straps 36, best shown in Figs. 1 and 3. These straps cooperate with the wall of the tank to which they are attached to form loops long enough to accommodate the movement of the bail incident to the swinging of the cover as it is moved from one of its positions to the other. By this construction the bail, or equivalent device, forms a brace which firmly supports the cover when it is in its open position, thereby making it capable of sustaining such loads as would ordinarily be placed upon it. It also supports the cover laterally when it is being swung from one position to the other.

In the upper portion of the tank are provided corner brackets 37 fixedly secured to the walls of the tank for the purpose of supporting a basket adapted to carry articles such as plates, saucers, cups, &c. This basket is of suitable dimensions to extend across the upper portion of the tank from end to end and from side to side, leaving a narrow space between the perimeter of the basket and the walls of the tank, as best shown in Fig. 2. Said basket comprises an upright rectangular reticulated frame or wall 38 which supports a removable rectangular flat member 39 composed of a metal rod bent to the proper shape and having its ends welded together. This member forms the bottom of the basket and rests on longitudinally extending rods 38ᵃ or equivalent supports carried by the frame 38. It carries a series of parallel cross-rods 40, 41, 42, 43 the ends of which are fixedly connected with the side portions of the member 39, preferably by spot welding. The rods 40, 41 are provided with a series of equally spaced vertical rods or fingers 44, 45 which cooperate to support the smaller dishes, such as saucers, while the rods 42, 43 have a corresponding series of vertical rods or fingers 46, 47 which cooperate to support similar larger dishes, the spaces between consecutive rods 46, 47 being wider than those between the rods 44, 45. Also the rods 42, 43 are preferably spaced further apart than the rods 40, 41, as clearly shown in Fig. 2. 48 indicates a series of longitudinally extending rods which brace the several rods 40, 41, 42 and 43. It is not intended that dishes be placed in the spaces between the rod 43 and the adjacent end wall of the basket, thus leaving open spaces A, B through which water can pass more freely than between the dishes carried by the basket. The purpose of this is to permit a part of the wash water to pass comparatively freely up above the dishes in the basket so that it can fall more effectively on the dishes in the basket. The end portion of the bottom 39 between the rod 40 and the adjacent end of the frame 38 is of reticulated construction, as shown at 49, so that it is adapted to support small or irregularly shaped articles which cannot well be placed between the upright fingers of the basket, this reticulated portion being preferably formed of a series of longitudinal and cross rods 50, 51, as shown at the left in Fig. 2. The basket as a whole, may be readily removed and replaced as the frame 38 rests loosely on the corner brackets 37, and is provided with handles 38ᵇ, or the bottom 39 may be separately removed to give access to the lower portion of the tank.

Below said basket at one end of the tank is a plate holding basket 52 comprising flaring U-shaped rods 53 which form the end members of the basket, a rectangular rod 54 connected with the upper or outer ends of the members 53, longitudinal rods 55 connected with the members 53 at the angles thereof and extending longitudinally of the basket, and a series of perpendicular rods 56 rising from the rods 55, at short intervals apart, to about the level of the frame 54. All these parts are fixedly secured together, preferably by spot welding, so that they form an openwork basket wider at the top than at the bottom and having a series of parallel perpendicular rods well adapted to receive and retain plates on edge. As shown in Fig. 1, one side of the frame 54 is adapted to hook over clips 57 secured to the side wall of the tank, and the ends of the rods 55 are bent downward so that they serve as feet which rest on the inclined bottom 9 of the tank, so that the basket as a whole is firmly supported in position at one side of the paddle wheel shaft and below the position occupied by the basket 38, the plates being thus presented edgewise to the paddles so that water may be thrown between them.

At the opposite end of the tank below the position occupied by the basket 38 and at a short distance from the wall of the tank are upright guides 58 secured to the side walls of the tank and adapted to receive and support a screen 59, the lower margin of which, when in position, rests on the bottom of the tank. This screen is best shown in Fig. 4 and comprises a substantially rectangular framework 60 having legs 61 which are adapted to rest on the bottom of the tank. Across this framework extend horizontal and vertical rods 62, 63 to form a reticulated screen through which water may pass freely. This screen cooperates with the adjacent end wall of the tank and with that portion of the bottom 9 lying between them to form a compartment which extends entirely across one end of the tank and is adapted to receive articles such as platters which cannot conveniently be accommodated in the baskets already described.

For receiving silverware I provide a cylindrical basket 64, the ends of which are formed of annular rods 65, 66. These rods are connected by a meshwork cylinder 67, and the bottom of the basket is formed of an annular rod 68 carrying meshwork 69. The rod 68 is connected with the rod 66 at suitable intervals by links 70, as shown in Fig. 5. This silverware basket is placed loosely in the tank in any convenient location where it will not interfere with the rotation of the paddles. 71 indicates a clip secured to one of the side walls of the tank for holding up out of the way the electric cord leading to the motor.

By the construction described I provide a washing machine in which there is practically no waste space, and therefore it has great capacity for its size, with consequent economy in cost of manufacture. The comparatively small size of the machine is also advantageous because of the limited available space in many houses or apartments. The cover construction provides a tight closure for the tank during washing operations and also a convenient table on which the dishes to be treated may be placed either before or after washing.

What I claim as my invention and desire to secure by Letters Patent, is—

1. The combination of a tank open at the top, a cover adapted to tightly close said opening, a hinge connection between said cover and the tank arranged to permit the cover to swing either to its closed position or to a substantially horizontal open position, and a bail mounted on the tank and connected with the cover to swing therewith, for supporting the same when it occupies the latter position.

2. The combination of a tank open at the top, a cover adapted to tightly close said opening, a hinge connection between said cover and the tank arranged to permit the cover to swing either to its closed position or to a substantially horizontal open position, a bail pivotally connected at one end with the cover, the intermediate portion of said bail extending alongside the tank, and a strap carried by the tank and loosely embracing said bail to permit vertical movement of the lower end portion thereof.

GEORGE S. BLAKESLEE.